Figure 2:
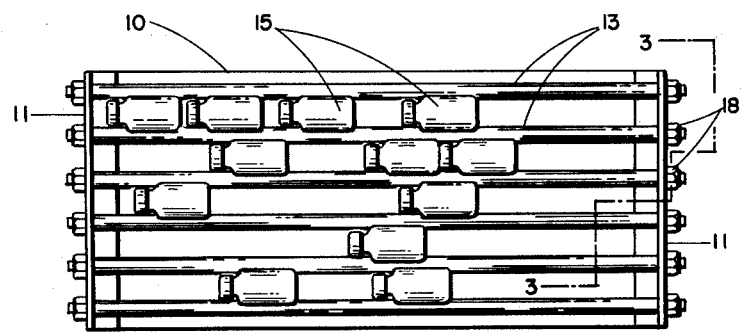

March 30, 1954 W. C. GRIFFIN ET AL 2,673,722
SHAKER APPARATUS
Filed March 25, 1952

WILLIAM C. GRIFFIN,
ROBERT W. BEHRENS,
INVENTORS

BY
Robert J. Mawhinney

Patented Mar. 30, 1954

2,673,722

UNITED STATES PATENT OFFICE

2,673,722

SHAKER APPARATUS

William Colvin Griffin, West Chester, Pa., and Robert William Behrens, Stanton, Del., assignors to Atlas Powder Company, Wilmington, Del., a corporation of Delaware Application March 25, 1952, Serial No. 278,452

2 Claims. (Cl. 259—59)

This invention relates to laboratory apparatus, and more particularly to apparatus for mechanically shaking cylindrical containers in horizontally reciprocating motion.

In the laboratory study of colloidal systems, and particularly of emulsions and emulsifying agents, it is necessary to subject successive test quantities of liquid mixtures to controlled agitation in a reproducible manner. A very satisfactory type of reproducible agitation is provided by a simple, short-stroke, horizontal, reciprocating movement of the mixture contained in a cylindrical bottle or jar, provided the length of the stroke, the frequency of the reciprocation, and the number of strokes are adequately controlled. A number of devices for mechanically imparting such motion to test bottles or containers have been proposed and are in use. Such devices adequately control the stroke-length, the frequency of reciprocation, and number of strokes (or length of shaking time) within close tolerances.

The prior art shakers, however, are uniformly subject to one inconvenience, which inconvenience is especially annoying when multiple samples must be subjected to short-time shaking periods. The said inconvenience is the necessity for clamping the bottles or jars on the reciprocating platform of the shaking device by means of sliding bars, rods, or other means, to prevent endwise movement of the bottles relative to the platform, which clamping usually requires the manipulation of one or more screws, wing nuts, springs, elastic bands, or the like, first in loading and again in unloading the apparatus. When the shaking time is short, i. e., of the order of 30 seconds, the operator's time in loading and unloading the shaker may well be greater than the operation time of the machine.

It is the object of this invention to provide a horizontally reciprocating shaker apparatus for cylindrical bottles, jars, and the like equipped with a novel rack or tray for holding such vessels during the shaking thereof.

More particularly, it is the object of the invention to provide a rack for supporting cylindrical bottles, jars, or the like vessels, on reciprocating shaking apparatus, which rack cooperates uniquely with the said vessels to hold them against shifting endwise in said rack.

The above and other objects will become apparent in the course of the following description and the appended claims.

The novel shaker of the invention comprises a horizontal bottle holding rack and means for imparting to said rack a horizontally reciprocating motion. There are many known devices for imparting horizontally reciprocating motion to laboratory shakers, any of which may be readily adapted to the apparatus of the invention. The invention resides in the novel rack described hereinafter, and in the combination of said rack with any suitable means for imparting a horizontally reciprocating motion thereto. In the drawings and detailed description of the invention a specific reciprocating device is employed for illustrative purposes, but the invention is not to be considered as limited to the particular embodiment described.

The novel rack which, in the combination embodiment of the invention, is mounted horizontally in reciprocatingly driven relation with the above-mentioned means, and which cooperates with cylindrical vessels to prevent endwise motion of said vessels relative to their position on said rack, comprises a plurality of rods with resilient surface, positioned axially relative to the direction of reciprocating motion, and so spaced laterally that the distance between the lines of support of cylindrical vessels laid therebetween is at least 90% of the external diameter of said vessels and is less than said diameter.

Figure 1:
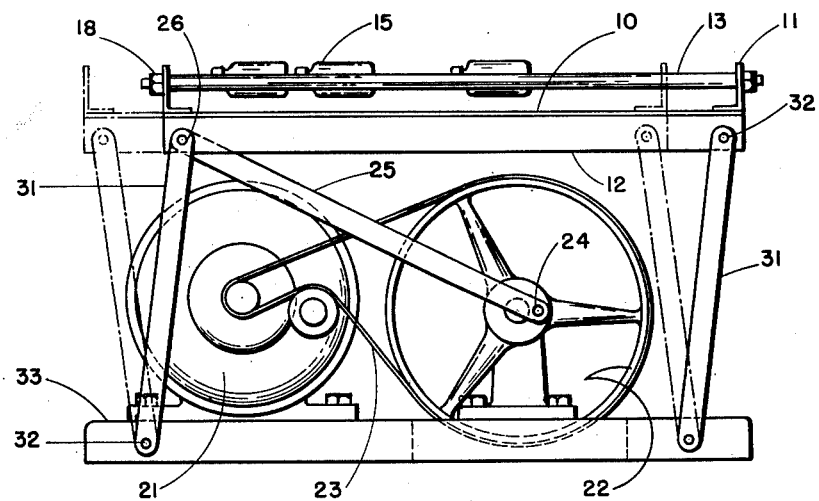
Figure 3:
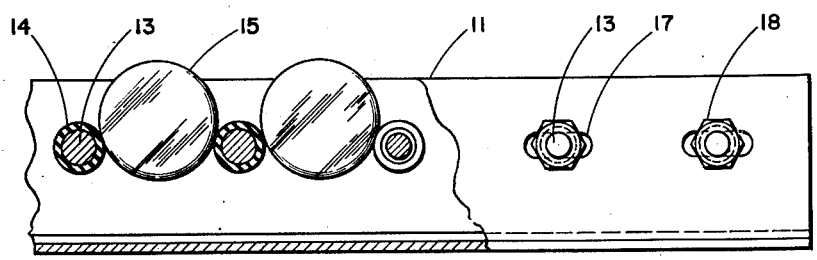

A clearer understanding of the novel device of the invention will be had by reference to the accompanying drawings wherein:

Figure 1 is a side view in elevation of a specific shaking apparatus made in accordance with the the invention, Figure 2 is a plan view of the same apparatus, and Figure 3 is an enlarged view, partially in section, of the vessels and vessel holding rack, along the line 3—3 of Figure 2.

Referring to the figures in more detail, the rack of the shaking apparatus is designated generally by 10. It comprises end framing 11, which project upwardly from side framing members 12, and parallel rods 13 bearing a resilient coating 14, fixed in spaced apart relationship between the end framing members. The lateral spacing of the said rod is sufficiently small that the cylindrical vessels 15 will not drop through the openings therebetween, i. e., is less than the outside diameter of the said vessels, and sufficiently large that the distance between the supporting lines of contact between the said rods and the vessel is at least 90% of the diameter of the said vessel. In the particular embodiment illustrated in the drawings, adjustability of lateral spacing between the rods to accommodate bottles of differing diameter is provided. The ends of the rods 13 are turned down to pass through slots 17 in the end framing members 11, and threaded to receive nuts 18. The rods are positioned to establish the desired lateral spacing with the nuts loosened and then locked against lateral movement by tightening of the nuts.

A horizontally reciprocating motion is imparted to the rack through a motor driven fly wheel and crank arrangement. The motor 21 is connected to the fly wheel 22 by belt 23. On a spoke of the fly wheel, is mounted a bearing 24, supporting one end of a connecting rod 25, the other end of which is journaled about a bearing near one end of a side framing member of the rack, indicated at 26.

Legs 31 supporting the rack are journaled about bearing surfaces 32 attached to the base 33 of the apparatus and the framing members of the rack, respectively.

As the flywheel 22 is driven by the motor 21 the wheel and connecting rod 25 together form a crank, and the frame is driven back and forth in a horizontal direction. The stroke length is fixed by the relation between the length of the connecting rod and the distance between the axle of the fly wheel and the bearing 24, while the reciprocating frequency is fixed by the speed with which the fly wheel is turned.

In accordance with the invention the distance between the lines of support of the cylindrical vessel 15 by adjacent supporting rods 13 is at least 90% of the outside diameter of the said vessel.

If the said distance between the lines of support is denoted by S, the outside diameter of the vessel by D, and the lateral spacing between the rods, measured between their nearest points by L, it is evident that, as the ratio between S and D approaches unity, S, D and L must all approach the same value. As the diameter of the rod 11 becomes very small with respect to D, the values of L and S approach identity, regardless of the ratio between D and S. Since the distance S is always intermediate in value between L and D it follows that by spacing the rods 11 so that, between their nearest points, they are apart by a distance equal to at least 90% of the bottle diameter but not as great as the bottle diameter, the rack will be in accordance with the invention.

It has been found that if the rack is constructed as above described, cylindrical vessels laid between the rods thereof are held against endwise movement with astonishingly great force, and that the contents of the vessels may be violently agitated by subjecting the rack and vessels to a horizontally reciprocating motion, with no need of any end clamping device to hold the vessels from endwise motion relative to the rack itself. The utility, in the laboratory, of a shaking apparatus for small vessels which requires no clamp adjustments, is obvious. In emulsifier testing, where samples must be subjected to controlled shaking in manifold replicate, the saving in time over the use of conventional shaking apparatus, when the device of the present invention is employed, is of especial importance. A second important advantage accrues from use of the present apparatus in emulsion testing, in that the shaken samples may be removed from the apparatus and transferred to observation tubes so very quickly after the controlled shaking period ends that there is virtually no time for a partial breakage of the emulsion, and re-emulsification during the said transfer. Time zero in the observation tube can be made to coincide much more closely with the end of the shaking period, than is the case when the machine must be stopped and clamps removed before the vessel can be removed from the shaker rack.

Those skilled in the art will recognize that many modifications of the specific apparatus illustrated and described in detail can be devised which are within the scope of the invention disclosed. Particularly with respect to the means for imparting reciprocating motion to the shaker rack, are such modifications obvious. The simple fly wheel and crank arrangement shown is for illustrative purposes only, and any equivalent means is to be considered equally within the purview of the patent.

What is claimed is:

1. A laboratory apparatus for shaking cylindrical containers comprising a plurality of parallel, resiliently-surfaced rods, lying in the same horizontal plane and laterally spaced apart by a distance such that the distance between lines of support contact between said rods and containers adapted to be placed therebetween is less than the outside diameter of said containers and is at least 90% of said diameter; means for laterally adjusting and fixing the rods to provide said spacing; and means for imparting horizontally reciprocating motion to said rods in their axial direction; the said containers being restrained against endwise motion relative to said rods solely by friction between the walls of said containers and the said resiliently-surfaced rods.

2. A laboratory apparatus for shaking cylindrical containers comprising a rack consisting essentially of end-framing members; a plurality of resiliently-surfaced rods lying in the same horizontal plane with their ends fixed in the said end-frame members, and laterally spaced so that the distance between lines of contact between said rods and containers adapted to be placed therebetween is less than the outside diameter of said containers and is at least 90% of the said diameter; and means for imparting horizontally reciprocating motion to said rack in the axial direction of said rods.

WILLIAM COLVIN GRIFFIN.
ROBERT WILLIAM BEHRENS.

References Cited in the file of this patent

UNITED STATES PATENTS

| Number | Name | Date |
|---|---|---|
| 112,485 | Peiffer et al. | Mar. 7, 1871 |
| 145,003 | Muntzenberger | Nov. 25, 1873 |
| 1,301,070 | Maddox | Apr. 15, 1919 |
| 1,445,488 | Clark | Feb. 13, 1923 |
| 1,940,492 | Gale | Dec. 19, 1933 |